US007926731B2

(12) United States Patent
Aksamit et al.

(10) Patent No.: US 7,926,731 B2
(45) Date of Patent: Apr. 19, 2011

(54) PROTECTED STORAGE OF DATA ON OPTICALLY-READABLE MEDIA

(75) Inventors: Slavek Peter Aksamit, Durham, NC (US); David Daniel Chudy, Raleigh, NC (US); Cristian Medina, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 11/615,334

(22) Filed: Dec. 22, 2006

(65) Prior Publication Data

US 2010/0034068 A1 Feb. 11, 2010

(51) Int. Cl.
*G06K 19/06* (2006.01)

(52) U.S. Cl. ........................................ 235/494; 235/495

(58) Field of Classification Search .................. 235/494, 235/495; 369/13.01–13.05, 13.39–13.41, 369/26.01, 30.08, 44.11
See application file for complete search history.

(56) References Cited

U.S. PATENT DOCUMENTS

| | | | | |
|---|---|---|---|---|
| 4,677,604 | A | 6/1987 | Selby, III et al. | |
| 5,418,852 | A | 5/1995 | Itami et al. | |
| 5,449,590 | A * | 9/1995 | Imaino et al. | 430/270.2 |
| 5,513,260 | A | 4/1996 | Ryan | |
| 5,841,861 | A | 11/1998 | Konko et al. | |
| 5,930,215 | A | 7/1999 | Mitchell et al. | |
| 6,338,933 | B1 | 1/2002 | Lawandy et al. | |
| 6,505,216 | B1 * | 1/2003 | Schutzman et al. | 707/204 |
| 6,609,203 | B1 | 8/2003 | Gaston | |
| 6,709,802 | B2 | 3/2004 | Lawandy et al. | |
| 2002/0138747 | A1 | 9/2002 | Clarke | |
| 2005/0050343 | A1 | 3/2005 | Selinfreund et al. | |
| 2006/0227694 | A1 * | 10/2006 | Woerlee et al. | 369/275.1 |
| 2007/0030767 | A1 * | 2/2007 | Brondijk | 369/30.11 |
| 2007/0140072 | A1 * | 6/2007 | Agrawal et al. | 369/14 |

FOREIGN PATENT DOCUMENTS

| | | | |
|---|---|---|---|
| JP | 61 258347 | A | 11/1986 |
| WO | WO 2004/077422 | A | 9/2004 |

OTHER PUBLICATIONS

PCT/EP2007/063870.
International Search Report for PCT/EP2007/063870 (Not Published; Filed by Applicant), mailed to Applicant on Apr. 17, 2008.
EPO Application No. 07 857 517.2-1232 "Communication pursuant to Article 94(3) EPC", Feb. 2, 2010, 2 pages.
EPO Application No. 07 857 517.2-1232 "Communication pursuant to Article 94(3) EPC", Sep. 1, 2010, 4 pages.

* cited by examiner

*Primary Examiner* — Thien M Le
(74) *Attorney, Agent, or Firm* — Cynthia G. Seal; Jeffrey L. Streets

(57) ABSTRACT

Protection is provided for optically readable media. Data may be scrambled, encrypted, or otherwise obscured by apportioning the data across multiple layers of a disc in a secret pattern. Pattern information may be supplied in the form of a key to authorized devices or users. The data can only be read by an optical drive with the proper hardware having access to this key. Switchable mirrored regions are provided on the optical medium to selectively block and unblock an optical reader head from reading the data. To read the data back, an authorized/licensed device may use the key to selectively switch the electrochromic regions so that the reader head may access the data while alternately focusing on different data layers, as needed, to obtain the data in the proper order.

18 Claims, 5 Drawing Sheets

PROTECTED STORAGE OF DATA ON OPTICALLY-READABLE MEDIA

BACKGROUND OF THE INVENTION

1. Field of the Invention

The present invention relates to the protected storage of data on optically-readable media.

2. Description of the Related Art

A variety of optically-readable media are known in the art for storing and selectively retrieving digital data. Optically-readable media typically have a circular or disc-like form factor, and may be referred to interchangeably as "optical media," "optical discs," or "optical storage discs." The CD is among the earliest developed and most commonly available optical medium. Data is usually stored on an optical disc in a digitally encoded format as a series of tiny indentations ("pits") alternating with higher-elevation "lands," in a tightly packed spiral. The digitally encoded data is commonly encrypted, as well. These media are readable by a variety of different optical devices or "drives," including a variety of CD and DVD drives, CD and DVD decoders in home entertainment systems, video game consoles, and automobile navigation systems. An optical drive includes a reader head capable of focusing a laser or other beam of light on an optical storage disc to read the digitally encoded data. The difference in height between pits and lands leads to a phase difference between the light reflected from a pit and from its surrounding land. This optical behavior is processed electronically by the optical drive to correctly read the stored data.

Optical disc technology has been expanded to include not only the fixed storage of music and video files, but also editable or "writeable" formats also capable of storing other types of electronic data or computer "files." Writeable and re-writeable version of optical discs currently include CD-R, CD-RW, DVD, DVD-R, and DVD-RW. Emerging technology in optical media includes Blue-Ray discs, named for the blue-violet laser used to read and write this type of disc, as well as High-Density/High-Definition DVD (HD DVD). Some optical discs, such as dual-layer DVDs, store optically-readable data on at least two layers. One or more of the layers may be semi-transparent, to allow the reader head to focus its light beam on the desired layer to be read. It is reasonable to expect the possibility of currently available or future developed optical media to include more than two layers.

Despite the rapid and significant advances in optical media technology, today's optical media discs are not without limitations. Presently available optical discs have read/write surfaces in plain view of an optical reader head. Thus, all the actual raw data (encrypted or not) on an optical disc can potentially be viewed/read by anyone having access to a conventional optical drive. Even encrypted data may potentially be copied, such as using "bit-by-bit" or other brute-force techniques. For example, an unauthorized disc replicator can replicate an encrypted movie DVD in a format readable on DVD players, even without knowing the encryption algorithm used to decrypt the digitally encoded data. Even multi-layer discs have their data written contiguously on each layer, making it easy for one to obtain and/or copy data from different layers.

In view of the limitations and disadvantages of currently-available optical media technology, methods and devices are needed for better and more secure storage and retrieval of data on optical media. It would be desirable for the improved methods and devices to provide increased protection against unauthorized reading and/or copying of data, while incorporating at least some aspects of existing optical media technology, such as the use of a focused beam of light to read data.

SUMMARY OF THE INVENTION

According to one embodiment, an apparatus is provided, including an optically-readable medium has a plurality of data layers. The optically-readable medium includes at least one blocking layer having a plurality of circumferentially-arranged electrochromic regions for controlling the transmission of light between a reader head of an optical drive and at least one of the data layers.

According to another embodiment, data is separated into a plurality of data portions. The data portions are written among different data layers of a multi-layer, optically readable medium. The data portions are circumferentially arranged on the data layers in a selected pattern. Light to one or more of the data layers is selectively blocked, such that the data portions are readable by an optical reader head according to the selected pattern. This method may be implemented in the form of a computer program product having a computer usable medium including computer usable program code for protection of data on the optically readable medium.

Other embodiments, aspects, and advantages of the invention will be apparent from the following description and the appended claims.

DETAILED DESCRIPTION

The present invention provides protection for optically readable media. Data may be scrambled, encrypted, or otherwise obscured by apportioning the data across multiple layers of a disc in a secret pattern. Pattern information may be supplied in the form of a key to authorized devices or users. The data can only be read by an optical drive with the proper hardware having access to this key. Switchable mirrored regions referred to as "electrochromic regions" are also provided on the optical medium to selectively block and unblock an optical reader head from reading the data. These electrochromic regions may be made of a special alloy, such as between magnesium and one or more transition metals (like Nickel or Manganese) that change reflectivity in response to an applied electrical potential (voltage). In order to read the data back, an authorized/licensed device uses the key to selectively switch the electrochromic regions so that the reader head may access the data. Protection is therefore provided on at least two levels. First, an unauthorized or unlicensed device will not have the ability to switch on or off the electrochromic regions to access all of the data. Thus, attempts to copy the data will fail, because the reflective regions will obscure at least part of the data from the optical reader head. Second, even if an unauthorized user is somehow able to switch all of the electrochromic regions to a transparent state, an attempt to read or copy the disc will result in random, unintelligible, or otherwise obscured rendering of the data without the secret pattern information contained within the key.

Figure 1:
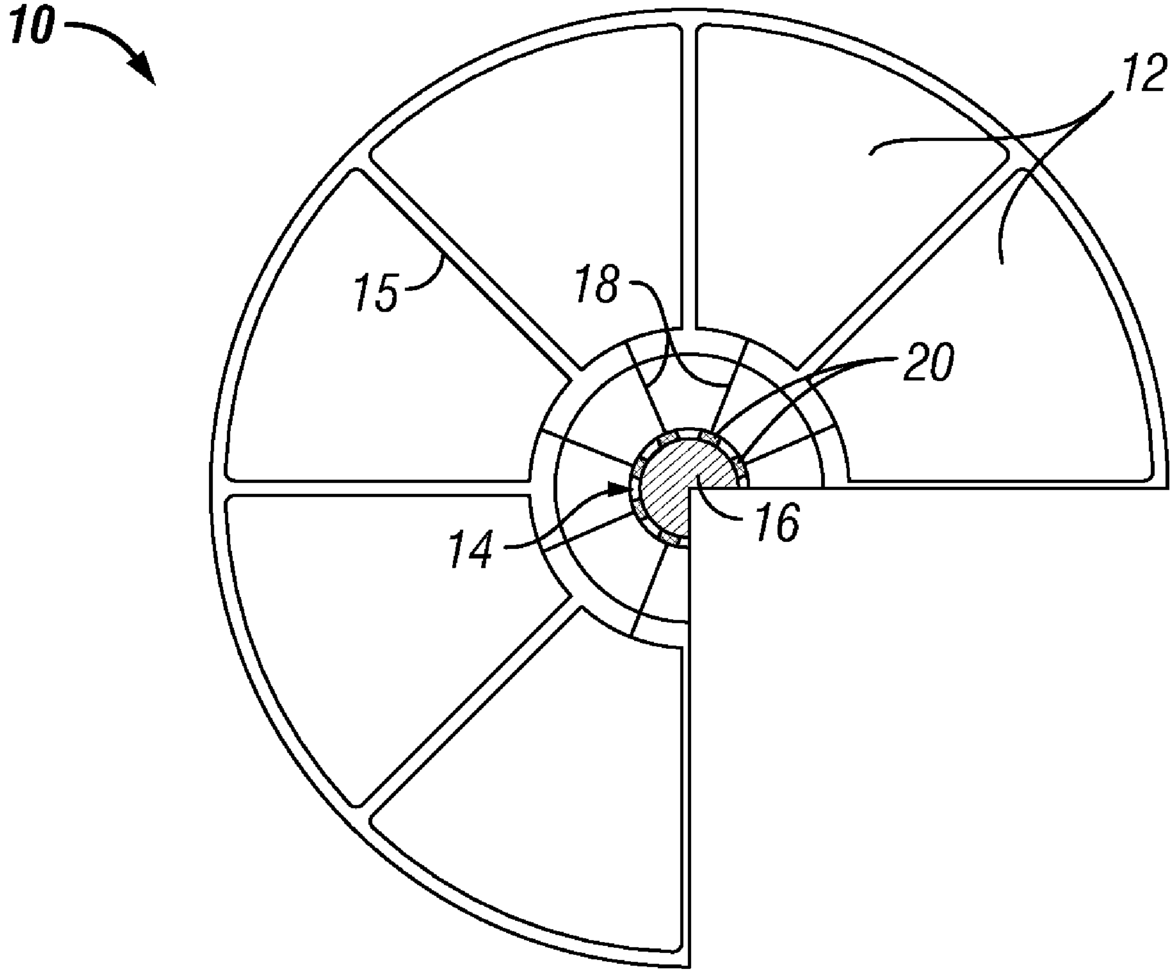
FIG. 1 is a partial plan view of an exemplary optically readable medium ("disc") according to the invention.

FIG. 1 is a partial plan view of an exemplary optically readable medium ("disc") 10 according to the invention. The disc 10 optionally has a form factor similar to that of a conventional DVD, a CD, or their derivatives, and includes a through hole 14 for receiving a special spindle 16 of an optical drive according to the invention. A plurality of electrochromic regions 12 are circumferentially arranged on the disc 10 for selectively blocking or impeding a light beam from an optical reader head, thereby thwarting unauthorized attempts to read the contents of the disc 10. A conventional optical drive will be unable to read or replicate the disc 10 due to the at least partial obstruction of data by the electrochromic regions 12. In the embodiment shown, eight electrochromic regions 12 are included, though any number of electrochromic regions may be included in other embodiments. The electrochromic regions 12 are somewhat "pie-shaped" and arranged in a substantially contiguous manner, such that the electrochromic regions 12 are nearly touching. The electrochromic regions 12 need not be contiguous nor continuous, however. For example, a random array of non-contiguous electrochromic regions 12 would be sufficient to at least partially obscure the reading of data. The electrochromic regions may also have different and optionally randomly-ordered default states, such as with some in a reflective state by default and others in a transparent state by default. The different states are discussed further detail below.

The electrochromic regions 12 are typically made of a very thin layer of electrochromic material that may be on or embedded within a substrate of the disc 10. A variety of electrochromic materials are known in the art, including certain alloys of magnesium with one or more transition metals such as nickel or manganese. Response times on the order of nanoseconds have been observed for certain electrochromic material configurations. The electrochromic regions 12 may be electrically insulated with respect to one another, as indicated at an insulating boundary 15 between each adjacent electrochromic region 12. The insulating boundary 15 may include, for example, a gap between the adjacent electrochromic regions 12, wherein the disc substrate may provide sufficient electrical insulation between electrochromic regions 12. Alternatively, the insulating boundary 15 may comprise any of a variety of insulating materials known in the art.

To allow voltages to be applied to selectively switch the electrochromic regions 12 between states, a plurality of electrical pathways 18 extend from the electrochromic regions 12 to a respective plurality of electrical contacts 20 on the spindle 16. The electrical pathways 18 may be embedded within or disposed on the substrate of the disc 10. For example, circuit board technologies used to economically etch or otherwise form very thin electrical pathways in substrates may be adapted by one skilled in the art to provide electrical communication between the electrochromic regions 12 and the electrical contacts 20 on the spindle 16.

Figure 2:
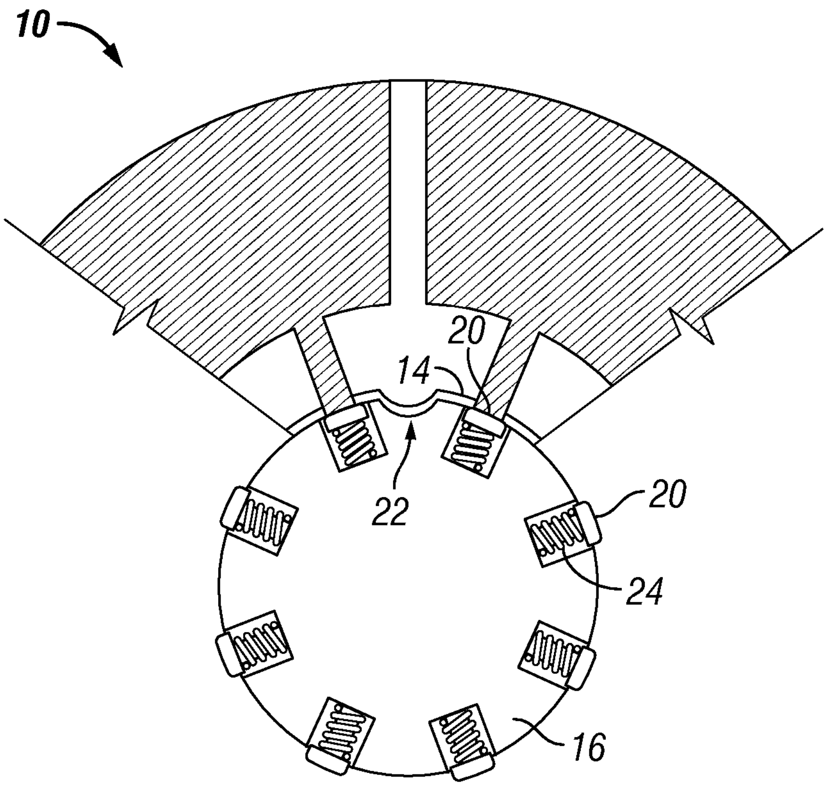
FIG. 2 is a closer view of a section of the disc, detailing some optional features.

FIG. 2 is a closer view of a section of the disc 10 detailing some optional features. An optional spline portion 22 secures the disc 10 in a desired rotational alignment with respect to the spindle 16. This rotational alignment places the electrical pathways 18 in a predetermined position with respect to the electrical contacts 20 on the spindle 16. Thus, it is known which electrical contacts 20 and electrical pathways 18 are in electrical contact with one another. As the disc 10 is placed on the spindle 16, the disc 10 selectively engages the electrical contacts 20. Optionally, the electrical contacts 20 are each radially outwardly biased with a spring member 24, to ensure reliable electrical contact between the electrical pathways 18 and the electrical contacts 20. The spring member 24 may comprise any other variety of spring materials and configurations, for example, the spring member 24 may comprise a conventional coil spring or an elastomeric material. Alternatively, the electrical contacts 20 may have a "leaf spring" configuration, allowing the electrical contacts 20 themselves to provide spring action. A metallic material may be selected for the electrical contacts 20 that possesses both the electrical conductivity necessary to supply a voltage to the disc 10 and the mechanically flexibility to allow the electrical contacts 20 to be positively biased toward the electrical pathways 18 of the disc 10.

Figure 3:
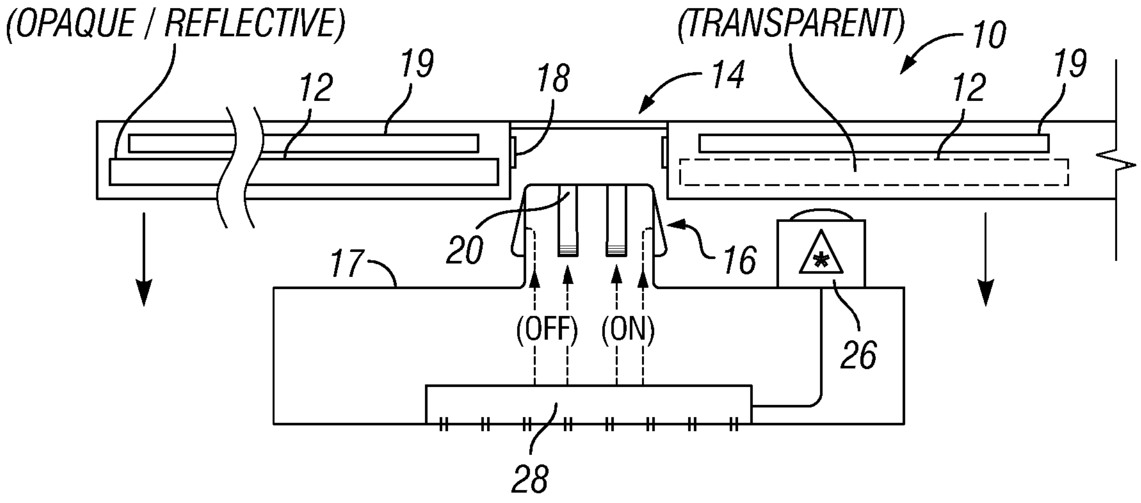
FIG. 3 is a side elevation view of the disc, with the spindle entering the through hole.

FIG. 3 is a side elevation view of the disc 10, with the spindle 16 entering the through hole. The through hole 14 is concentrically positioned with respect to the spindle 16 about the spindle's axis of rotation. As the disc 10 is axially urged further downward, the electrical pathways 18 will engage the electrical contacts 20, and the disc 10 will be securely seated on the spindle 16. The spindle 16 is part of a rotary member 17 that allows the seated disc 10 to rotate at a fixed axial distance from an optical reader head 26. The invention also encompasses alternative embodiments of a spindle-less rotary member to which a disc may be secured above an optical reader head and in electrical communication with electrical contacts on the rotary member. The reader head 26 selectively emits a laser to read data written on the disc 10. The reader head 26 is an electronic communication with a controller 28, which may include a conventional CPU, computer-chip, or processor. The controller 28 is capable of interpreting signals from the rear head 26 to read data from the disc 10.

The rotary member 17, including the spindle 16, the controller 28, and the optical reader head 26 are typically components of an "optical drive" according to the invention. An optical drive according to the invention may be similar to or optionally adapted from a conventional optical drive. The optical drive may be used in a variety of devices and applications, such as in a read/write drive of a computer, a game console resembling a conventional game console, an optical audio video player resembling a conventional optical audio video player such as a DVD player or CD player, an automobile navigation system resembling a conventional, DVD-based automobile navigation system, or other devices incorporating an optical reader head and a processor for reading digitally encoded data.

The controller 28 is in electrical communication with the plurality of electrical contacts 20, which may be selectively switched "ON" as indicated on the right or "OFF" as indicated on the left. In this embodiment, the electrochromic regions 12 are in a "blocked" state by default (in the absence of an applied voltage). The blocked state at least reduces the transmission of light through the electrochromic regions 12 sufficient to prevent the reader head 26 to read the data portions 19 beyond the electrochromic regions 12. Thus, the reflective surfaces of a disc according to the invention will block at least some of the data from being read by default.

Depending on the material and configuration, an electrochromic region in the unblocked state may be transparent or at least translucent. An electrochromic region in the blocked state may have some degree of reflectivity or opacity, but may still allow at least some light to pass through the electrochromic regions 12. The electrochromic regions 12 in this embodiment may then be selectively switched to an "unblocked" state by turning the electrical contacts 20 "ON" to supply a voltage to selected electrochromic regions 12. The unblocked state permits sufficient transmission of light through the electrochromic region 12 to allow the reader head 26 to read data on data portions 19 beyond the electrochromic regions 12. Thus, by selectively switching the electrochromic regions 12, the controller 28 may control which data portions 19 may be read beyond the layer containing the electrochromic regions 12.

Figure 4:
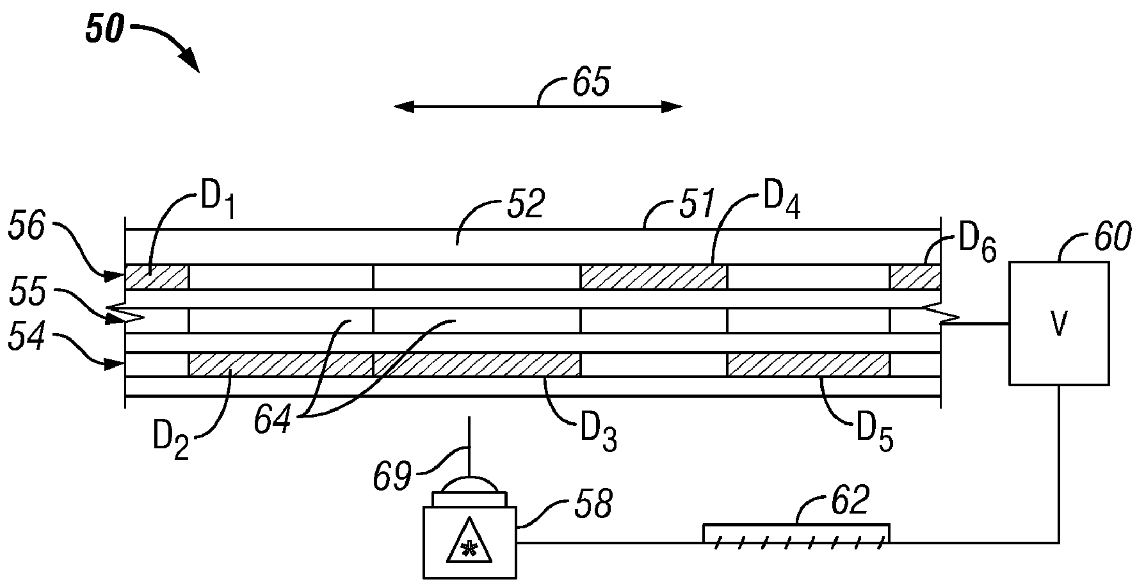
FIG. 4 is a schematic cross-sectional view of an embodiment of a system according to the invention, wherein data may be selectively read from an optically readable medium.

FIG. 4 is a schematic cross-sectional view of an embodiment of a system 50 according to the invention, wherein data may be selectively read from an optically readable medium 51. The system 50 includes a dual layer, the optically readable medium ("disc") 51, an optical reader head 58, a voltage source 60, and a controller 62 in electronic communication with both the optical reader head 58 and the voltage source 60. The disc 51 includes a substrate 52, which may comprise a polycarbonate material such as that used for the substrate of conventional optical media. A first data layer 54 and a second data layer 56 are embedded within the substrate 52. Digitally encoded data may be written to and optically read from the data layers 54, 56 using the optical reader head 58. The first and second data layers 54, 56 may include a series of pits and lands (not shown), as in the read/write surface of a conventional optically readable medium. Data on the disc 51 is demarcated or separated into multiple data portions consecutively labeled D1 through D6 in the order in which the data is intended to be read. The data portions D1-D6 are apportioned as shown among the data layers 54, 56. To be properly read, the data portions D1-D6 should be read consecutively and continuously, wherever they are found. This requires the reader head 58 to selectively focus on layer 54, for reading data on layer 54, or on layer 56, for reading data on layer 56. This information may be supplied in the form of a key. The key may be recorded somewhere on the disc, and may be protected by an encryption algorithm. Alternatively, the key may be supplied over the Internet, or through any other communication channel available to the system 50.

An electrochromic layer 55 is interposed between the data layer 54 and the data layer 56. The electrochromic layer 55 includes a plurality of independently switchable electrochromic regions 64. Some or all of the electrochromic regions 64 are in an opaque state by default. The electrochromic regions 64 in the default opaque state obscure portions of the data layer 56. Although not required, another electrochromic layer (not shown) may optionally be supplied between the data layer 54 and the optical reader head 58, to obscure portions of the data layer 54. The electrochromic regions 64 are contiguous in this embodiment. Information about which electrochromic regions 64 must be switched may also be contained within the key. The voltage source 60 is in electronic communication with the electrochromic regions 64 to selectively switch the electrochromic regions 64. When any of the electrochromic regions 64 are switched to their transparent state, the optical reader head 58 is free to focus past them onto data layer 56. When focused on the data layer 54, the optical reader head 58 is capable of reading data written on the data layer 54. The data layer 54 is semi-transparent. The key, containing pattern information, instructs the optical reader head 58 at any given moment whether to read the data layer 54 or the data layer 56. When reading the data layer 56, the optical reader head 58 transmits a light beam 69 through the semi-transparent data layer 54, through any electrochromic regions 64 in the trajectory of the light beam 69, and focuses the light beam 69 on the data layer 56. Thus, as the disc 51 rotates about an axis (not shown), the optical reader head 58 may selectively alternate between focusing on data layer 54 and data layer 56 while switching any opaque electrochromic regions 64 to the transparent state according to the pattern information contained within the key, to read the data portions D1-D6 consecutively, with the correct timing, and in the correct order. By contrast, a conventional device would not be able to focus light beam past any electrochromic regions 64 while in their opaque state, thereby obstructing conventional optical readers from reading or copying the data correctly. Even if the electrochromic regions 64 were defeated, a conventional device would not "know" which of the data layers 54, 56 to focus on and when to switch between them.

The electrochromic regions 64 are substantially aligned with the data portions D1-D6 so that specific data portions may be selectively blocked or unblocked. The data portions D1-D6 are slightly spaced axially with respect to an axis of rotation of the disc 51, and within the confines of the relatively thin disc 51. However, the data portions D1-D6 are substantially contiguous with one another in a direction of movement 65 of the disc 51 with respect to the optical reader head 58. This allows substantially continuous reading of the consecutive data portions D1-D6 in the control of an authorized user.

Figure 5:
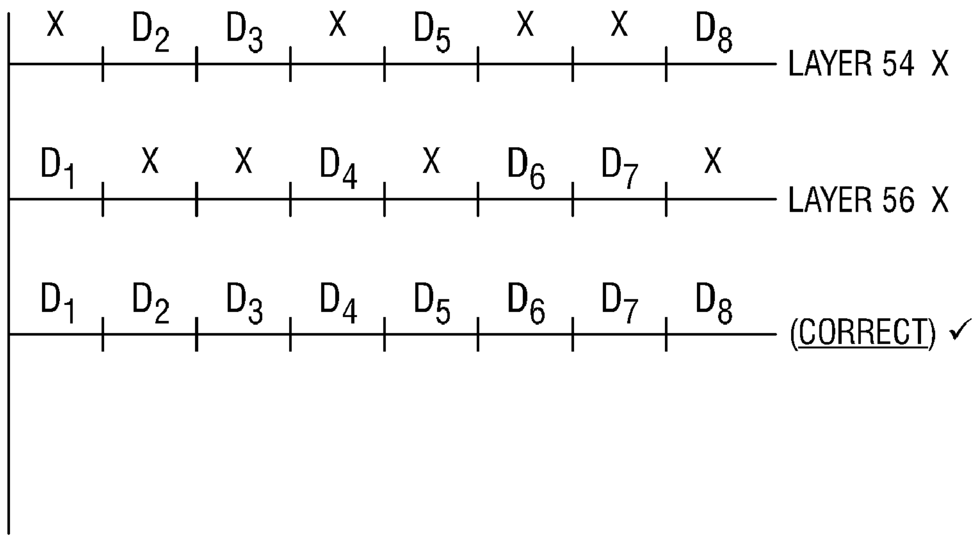
FIG. 5 is a diagram comparing successful reading of the data on the disc using an authorized device with unsuccessful attempts at reading or copying the data on the disc using a layer by layer approach.

FIG. 5 is a diagram comparing successful reading of the data on the disc 51 using an authorized device with unsuccessful attempts at reading or copying the data on the disc 51 using a layer by layer approach. Unauthorized reading or replicating of the data on the disc 51 is prevented by the apportionment of data portions D1-D6 among the two data layers 54, 56 and the interposition of the electrochromic layer 55. Even if one attempts to copy just the data layer 54, data portions D2, D3, and D5 (and D8, etc.) will be read sequentially, without intervening data portion D4, which will result in a corrupted or otherwise non-useful rendering the data. Furthermore, this leaves a physical gap between data portions D3 and D5, where D4 is supposed to be read, as the disc 51 moves with respect to the optical reader head 58. These gaps will further corrupt an unauthorized attempt at reading just the data layer 54. Likewise, if the electrochromic regions 64 are defeated in order to read the data layer 56, data portions D1 and D4 will be read sequentially without intervening data portions D2 and D3, which will similarly result in a corrupted or otherwise non-useful rendering of the data. Thus, even if an unauthorized user were able to turn on or off the entire electrochromic layer 55, the ability to do so would not allow the unauthorized user to properly read or replicate the disc 51. Only by knowing the pattern ("reflectivity pattern") of apportionment of the data portions D1-D6, and selectively switching the electrochromic regions 64 accordingly, can a user correctly read and replicate the disc 51. The key containing this pattern information is accessible to the processor 62. The key may be used to control the voltage source 60 to correctly switch the electrochromic regions 64 and selectively focus on the data layers 54, 56.

Alternative embodiments may include different configurations and arrangements of data layers, data portions, electrochromic layers, and electrochromic regions. For example, the number of electrochromic regions may optionally be increased to increase the number of different reflectivity patterns possible, for increased security. Additional data layers may also be provided, and data may be apportioned to these additional data layers. Any number of intervening electrochromic layers may also be provided.

Figure 6:
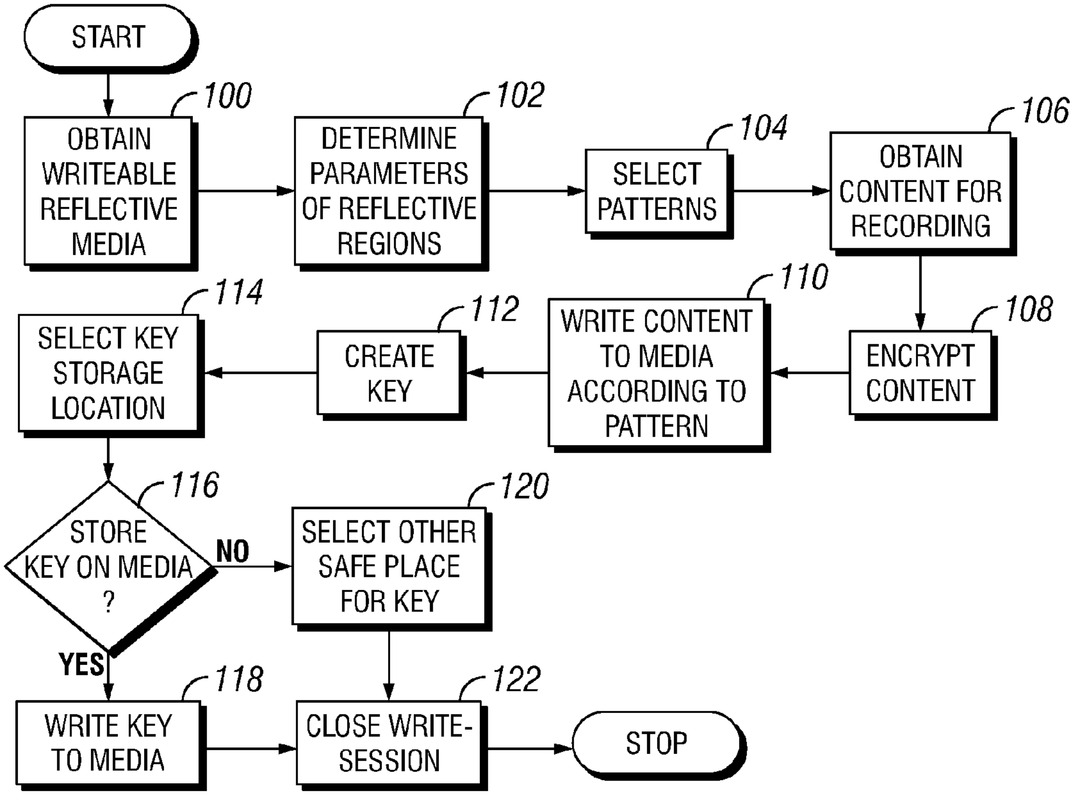
FIG. 6 is a flowchart of one method of writing data in a protected format to an optically readable medium according to the invention.

FIG. 6 is a flowchart of one method of writing data in a protected format to an optically readable medium according to the invention. The flowchart provides a general outline of the method, and is not intended to limit the method to the number or sequence of steps shown. In step 100, an optical medium according to the invention is obtained. The optical medium may include multiple data layers and one or more reflective layers containing multiple electrochromic ("reflective") regions. The optical medium may be in an unwritten state, configured for recording data. The optical medium may be writable using, for example, mass-replicating equipment constructed according to and licensed under this invention to a commercial replicator for producing multiple copies, or to an individual user having an optical drive constructed according to and licensed under this invention. In step 102, information about the reflective regions on the optical medium are determined. In particular, the size and spacing of the selectively reflective regions may be determined. The size and spacing of the reflective regions may determine the timing of turning on and off the reflective regions as they will subsequently pass under an optical reader or writer head. In step 104, take the apportionment and reflectivity patterns are selected or identified.

In step 106, content is obtained for recording. Content and data, as the terms used throughout, generically denotes anything that may be written to and subsequently read from an optical medium, such as digitally encoded audio files, video files, games or other software, computer files, and the like. For example, the user of a personal computer having an optical drive according to the invention may select files to be written to the optical medium using a conventional PC interface such as a keyboard, mouse, and display device. In step 10 wait, this content is optionally encrypted according to a conventional encryption algorithm. In step 110, the content (encrypted or not) is written to the medium according to the patterns that were selected in step 104. These patterns are also encoded in a key created in step 112. In step 114, a location to store this key is selected. For example, if the decision is made to store the key on the optical medium (step 116), the key may be written directly to the optical medium (step 118). The key is optionally encrypted to reduce the likelihood of obtaining the pattern information by unauthorized users. Alternatively, another safe place for the key may be selected in step 120. For example, in the case of commercially available game software, the key may be provided over the Internet during the registration process. In step 122, the write session is closed, at which point the optical medium may be ready for subsequent playback or reading of the data.

Figure 7:
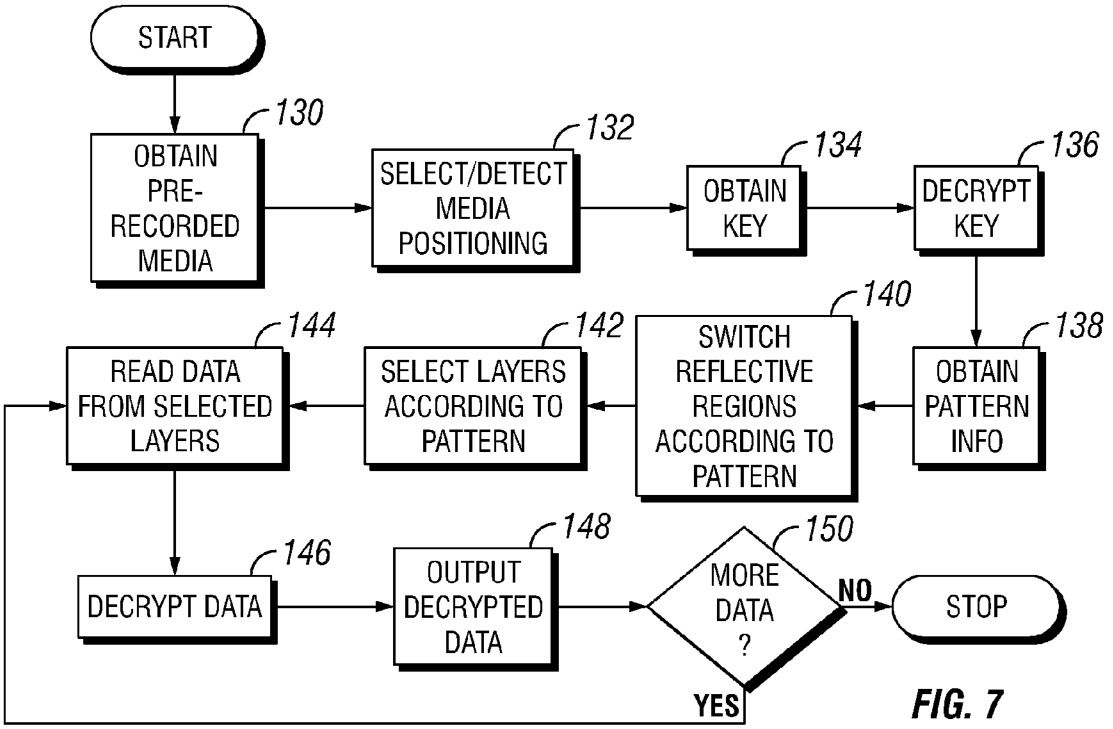
FIG. 7 is a flowchart of one method of reading data written in a protected format to an optically readable medium according to the invention.

FIG. 7 is a flowchart of one method of reading data written in a protected format to an optically readable medium according to the invention. The flowchart provides a general outline of the method, and is not intended to limit the method to the number or sequence of steps shown. In step 130, a pre-recorded medium is obtained, such as an optical disc written in the manner outlined in FIG. 6. In step 132, the positioning of the disc with respect to an optical drive is selected or detected. For example, and embodiments of an optical drive having a splined spindle, the position of the optical disc with respect to the spindle and the electrical contacts thereon is known. Alternatively, the relative position of the disc with respect to the spindle may be determined, so that the subsequent switching of reflective regions and reading of data may be synchronized.

In step 134, one or more keys are obtained containing information about the reflectivity pattern on the disc as well as the pattern in which data was written to the disc. If the key is encrypted, then the key may be decrypted in step 136. In step 138, these patterns may be ascertained from the key. In step 140, the various reflective regions are switched, as needed, according to the pattern. In one embodiment, the reflective regions may be temporarily switched to a static reflective pattern. In the static reflective pattern, the reflective regions may remain in their switched states for as long as necessary to read the data. Alternatively, the layers may be switched as needed as they alternately approach and exit the optical reader head. According to step 142, the data layers to be read from at any given moment are selected according to the pattern. In step 144, data may be read from the selected layers and from selected data regions according to the pattern. The optical reader head may alternately focus on the different layers as needed according to this pattern.

If the recorded data was previously encrypted according to a conventional encryption algorithm, then the encrypted data may be decrypted in step 146. It may be observed that, this conventional type of encryption is generally separate from a process of encoding, encrypting, or otherwise protecting data according to the invention. However, the additional use of a conventional encryption algorithm to encrypt the data, itself, desirably provides an ex-to measure of security. In step 148, the decrypted data is output. For example, if the disc contains game software, the output may include what appears to the end-user as conventional game play. In conditional step 150, it is determined whether there is more data to be read from the disc. For example, in a game play scenario, there may be a continual process of reading data due to the dynamic nature of game play. Alternatively, all of the necessary data may be read one time and optionally stored in RAM for subsequent use during a user session.

It should be recognized that the invention, itself, may include both hardware and/or software elements. Non-limiting examples of software include firmware, resident software, and microcode. More generally, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disc and an optical disc. Current examples of optical discs include compact disc-read only memory (CD-ROM), compact disc-read/write (CD-R/W), and DVD.

A data processing system suitable for storing and/or executing program code typically includes at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices such as keyboards, displays, or pointing devices can be coupled to the system, either directly or through intervening I/O controllers. Network adapters may also be used to allow the data processing system to couple to other data processing systems or remote printers or storage devices, such as through intervening private or public networks. Modems, cable modems, Ethernet cards, and wireless network adapters are examples of network adapters.

Figure 8:
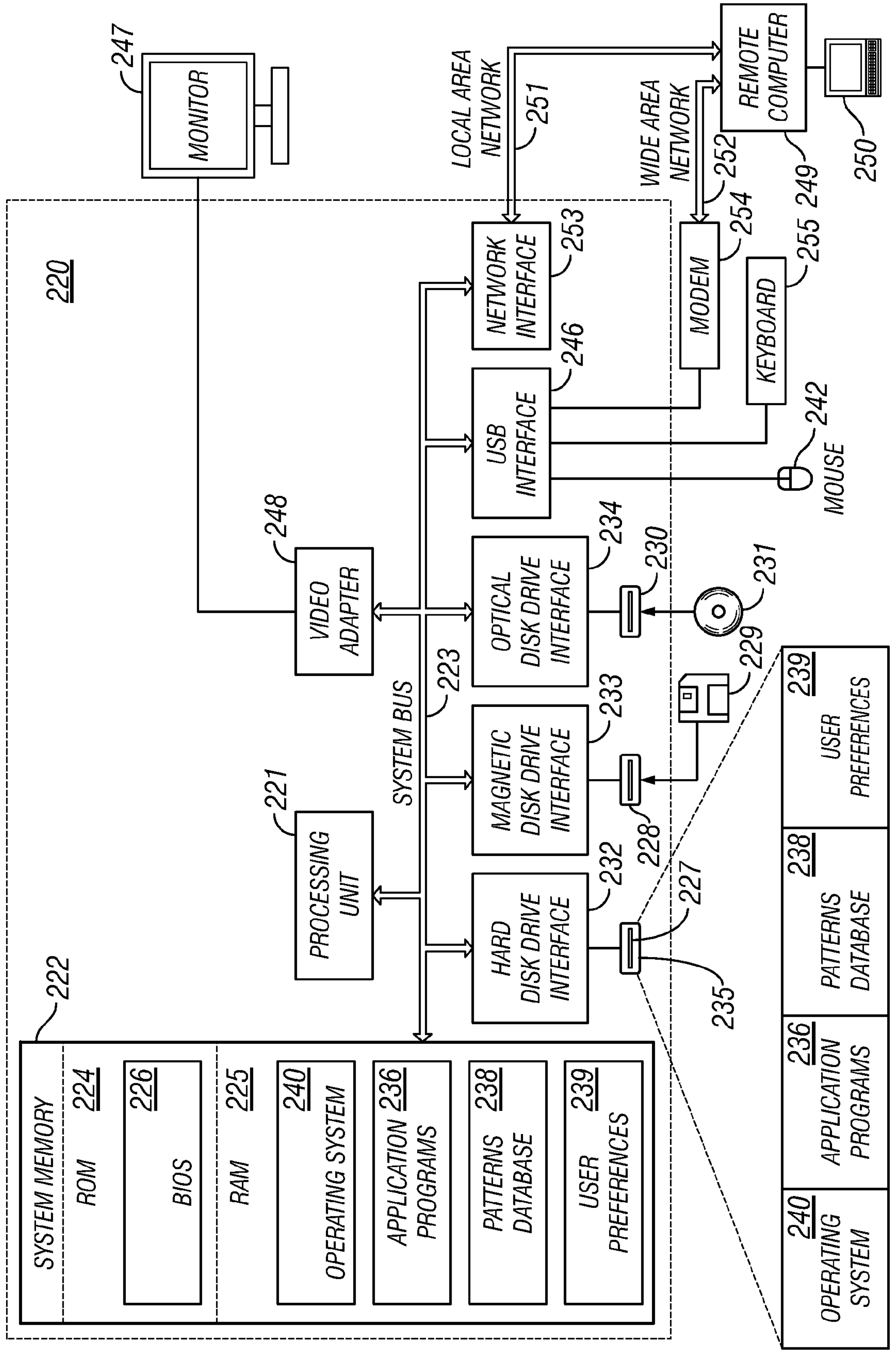
FIG. 8 is a schematic diagram of a computer system generally indicated at that may be configured for protecting content on optically readable media according to the invention.

FIG. 8 is a schematic diagram of a computer system generally indicated at 220 that may be configured for protecting content on optically readable media according to the invention. The computer system 220 may be a general-purpose computing device in the form of a conventional computer system 220, although the computer system 220 may also take the form of a game console or other device. Generally, computer system 220 includes a processing unit 221, a system memory 222, and a system bus 223 that couples various system components, including the system memory 222 to processing unit 221. System bus 223 may be any of several types of bus structures including a memory bus or memory controller, a peripheral bus, and a local bus using any of a variety of bus architectures. The system memory includes a read only memory (ROM) 224 and random access memory (RAM) 225. A basic input/output system (BIOS) 226 is stored in ROM 224, containing the basic routines that help to transfer information between elements within computer system 220, such as during start-up.

Computer system 220 further includes a hard disc drive 235 for reading from and writing to a hard disc 227, a magnetic disc drive 228 for reading from or writing to a removable magnetic disc 229. An optical disc drive 230, which may be configured according to the invention, is also provided. In addition to features of conventional optical drives, the optical drive 230 may be configured for reading from or writing to a removable optical disc 231 according to the invention, which may be (or have a form factor similar to) a CD-R, CD-RW, DV-R, or DV-RW, Blue-Ray disc, HD-DVD, multi-layer DVD, or the like. The optical disc 231 or another optical disc may also be used to store software according to software embodiments of the invention. Likewise, the optical disc drive 230 or another disc drive 230 may be used to read software from an optical disc containing such software. Hard disc drive 235, magnetic disc drive 228, and optical disc drive 230 are connected to system bus 223 by a hard disc drive interface 232, a magnetic disc drive interface 233, and an optical disc drive interface 234, respectively. Although the exemplary environment described herein employs hard disc 227, removable magnetic disc 229, and removable optical disc 231, it should be appreciated by those skilled in the art that other types of computer readable media which can store data that is accessible by a computer, such as magnetic cassettes, flash memory cards, digital video discs, Bernoulli cartridges, RAMs, ROMs, USB Drives, and the like, may also be used in the exemplary operating environment. The drives and their associated computer readable media provide nonvolatile storage of computer-executable instructions, data structures, program modules, and other data for computer system 220. For example, the operating system 240 and application programs 236 may be stored in the RAM 225 and/or hard disc 227 of the computer system 220.

A user may enter commands and information into computer system 220 through input devices, such as a keyboard 255 and a mouse 242. Other input devices (not shown) may include a microphone, joystick, game pad, touch pad, satellite dish, scanner, or the like. These and other input devices are often connected to processing unit 222 through a USB (universal serial bus) 246 that is coupled to the system bus 223, but may be connected by other interfaces, such as a serial port interface, a parallel port, game port, or the like. A display device 247 may also be connected to system bus 223 via an interface, such as a video adapter 248. In addition to the monitor, personal computers typically include other peripheral output devices (not shown), such as speakers and printers.

The computer system 220 may operate in a networked environment using logical connections to one or more remote computers 249. Remote computer 249 may be another personal computer, a server, a client, a router, a network PC, a peer device, a mainframe, a personal digital assistant, an internet-connected mobile telephone or other common network node. While a remote computer 249 typically includes many or all of the elements described above relative to the computer system 220, only a memory storage device 250 has been illustrated in FIG. 8. The logical connections depicted in the figure include a local area network (LAN) 251 and a wide area network (WAN) 252. Such networking environments are commonplace in offices, enterprise-wide computer networks, intranets, and the internet.

When used in a LAN networking environment, the computer system 220 is often connected to the local area network 251 through a network interface or adapter 253. When used in a WAN networking environment, the computer system 220 typically includes a modem 254 or other means for establishing high-speed communications over WAN 252, such as the Internet. Modem 254, which may be internal or external, is connected to system bus 223 via USB interface 246. In a networked environment, program modules depicted relative to computer system 220, or portions thereof, may be stored in the remote memory storage device 250. It will be appreciated that the network connections shown are exemplary and other means of establishing a communications link between the computers may be used. The network connections may be used to obtain a key containing information about data and reflectivity patterns for the optical disc 231.

Program modules may be stored on hard disc 227, optical disc 231, ROM 224, RAM 225, or even magnetic disc 229. The program modules may include portions of an operating system 240, application programs 236, or the like. A "patterns" database 238 may be included, which may contain parameters and procedures for selecting or assigning a reflectivity pattern and data apportionment pattern. A "user preferences" database 239 may also be included, which may contain parameters and procedures for customizing the user experience.

Aspects of the present invention may be implemented in the form of application program 236. Application program 236 may be informed by or otherwise associated with pattern database 238 and/or user preferences database 239. The application program 236 generally comprises computer-executable instructions for performing writing data to an optically readable medium in a protected fashion according to the invention, and/or reading data from the optically readable medium.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus, comprising:
   an optically-readable medium having a plurality of data layers and at least one blocking layer having a plurality of circumferentially-arranged electrochromic regions for controlling the transmission of light between a reader head of an optical drive and at least one of the data layers, wherein the at least one blocking layer selectively blocks the reader head from reading the data layers; and
   a data file comprising circumferentially arranged data portions alternating between the plurality of data layers in a pattern.

2. The apparatus of claim 1, further comprising:
   a voltage source for selectively switching each of the electrochromic regions between a light-transmitting state and a light-blocking state; and
   a controller in communication with the voltage source and having access to a key containing the pattern, the controller configured for selectively switching the electrochromic regions according to the pattern such that the circumferentially arranged data portions are readable consecutively by the reader head.

3. The apparatus of claim 2, wherein the key is encoded on the optically-readable medium.

4. The apparatus of claim 1, further comprising:
   a plurality of electrical contacts on the optically-readable medium in contact with the plurality of electrochromic regions;
   a rotary member configured for receiving the optically readable medium;
   a plurality of electrical contacts disposed on the rotary member for electrical communication with the electrical contacts on the optically-readable medium; and
   a voltage source in electrical communication with the electrical contacts on the rotary member, for selectively applying a voltage to selected electrochromic regions.

5. The apparatus of claim 4, wherein the rotary member further comprises a spindle, and the optically-readable medium further comprises a through-hole for receiving the spindle.

6. The apparatus of claim 5, wherein the electrical contacts on the optically-readable medium are disposed on an interior portion of the through hole, and the electrical contacts on the spindle are disposed on a periphery of the spindle, such that the electrical contacts of the spindle engage the electrical contacts on the optically-readable medium when the optically-readable medium is disposed on the spindle.

7. The apparatus of claim 5, further comprising:
   one of a keyed or splined portion disposed on one of the spindle and the optically-readable medium for positioning the optically-readable medium in a predetermined rotational alignment with respect to the spindle.

8. The apparatus of claim 1, wherein the data portions are substantially contiguous with one another in a direction of movement of the optically-readable medium with respect to the reader head.

9. A method, comprising:
   separating a data file into a plurality of data portions;
   encrypting the data file by writing the data portions in a selected pattern alternating between different data layers of a multi-layer, optically readable medium; and
   selectively blocking light to one or more of the data layers, such that the data portions written in the selected pattern are unblocked and readable by an optical reader head according to the selected pattern.

10. The method of claim 9, wherein the step of selectively blocking light to the one or more of the data layers comprises switching a plurality of electrochromic regions disposed on the optically-readable medium according to the arrangement of the data portions.

11. The method of claim 9, further comprising:
   rotating the optically readable medium under the optical reader head; and
   selectively focusing the optical reader head on the different layers to read the data portions according to the selected pattern.

12. The method of claim 9, further comprising:
   encoding the data portions into a key, and using the key to control one or both of which data portions to read and which electrochromic regions to switch.

13. The method of claim 12, further comprising encoding the key on the optically readable medium.

14. A computer program product comprising a computer usable medium including computer usable program code for protection of data on an optically readable medium, the computer program product including:
   computer usable program code for demarcating a data file into a plurality of data portions;
   computer usable program code for apportioning the data portions according to a pattern alternating between different data layers of a multi-layer, optically readable medium;
   computer usable program code for circumferentially arranging the data to the data layers as apportioned; and
   computer usable program code for selectively blocking light to one or more of the data layers, such that the data portions are readable by an optical reader head.

15. The computer program product of claim 14, wherein the step of selectively blocking light to the one or more of the data layers comprises switching a plurality of electrochromic regions disposed on the optically-readable medium according to the arrangement of the data portions.

16. The computer program product of claim 14, further comprising:
   computer usable program code for controlling rotation of the optically readable medium under the optical reader head; and
   computer usable program code for selectively focusing the optical reader head on the different layers according to the pattern to read the circumferentially-arranged data portions.

17. The computer program product of claim 14, further comprising:
   computer usable program code for encoding the pattern into a key, and using the key to control one or both of which data portions to read and which electrochromic regions to switch such that the data portions are read consecutively, with the correct timing, and in the correct order.

18. The computer program product of claim 17, further comprising:
   computer usable program code for encoding the key on the optically readable medium.

* * * * *